United States Patent
Chien et al.

(10) Patent No.: US 12,203,765 B2
(45) Date of Patent: *Jan. 21, 2025

(54) IDENTIFYING, PROCESSING AND DISPLAYING DATA POINT CLUSTERS

(71) Applicant: Google LLC, Mountain View, CA (US)

(72) Inventors: Steve Chien, San Carlos, CA (US); Mark Yinan Li, San Francisco, CA (US); Marc Schaub, Palo Alto, CA (US); Benjamin Anderson, Seattle, WA (US); James Aspinall, San Francisco, CA (US); Zhou Bailiang, Seattle, WA (US); Ruwen Hess, Yarrow Point, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,723

(22) Filed: Nov. 7, 2023

(65) Prior Publication Data

US 2024/0077324 A1    Mar. 7, 2024

Related U.S. Application Data

(63) Continuation of application No. 16/533,202, filed on Aug. 6, 2019, now Pat. No. 11,835,352, which is a
(Continued)

(51) Int. Cl.
*G06F 16/29* (2019.01)
*G01C 21/34* (2006.01)
(Continued)

(52) U.S. Cl.
CPC ..... *G01C 21/3476* (2013.01); *G01C 21/3682* (2013.01); *G06F 16/29* (2019.01); *G06F 16/9024* (2019.01); *H04W 4/21* (2018.02)

(58) Field of Classification Search
CPC ................ G06F 16/29; G06F 16/9024; G06F 16/3682
See application file for complete search history.

(56) References Cited

U.S. PATENT DOCUMENTS 5,418,906 A    5/1995    Berger et al.
7,383,125 B2    6/2008    de Silva et al.
(Continued)

FOREIGN PATENT DOCUMENTS

| CN | 101294818 A | 10/2008 |
|---|---|---|
| CN | 103323018 A | 9/2013 |
| CN | 104572805 A | 4/2015 |

OTHER PUBLICATIONS

"Bing Maps" [online]. [Retrieved Jun. 7, 2016]. [Retrieved from the internet: <https://wwww.bing.com/maps/?v=2&cp=40.725536957821035~-73.99976889517922&lvl=1>.
(Continued)

*Primary Examiner* — Baoquoc N To
(74) *Attorney, Agent, or Firm* — Lerner David LLP

(57) ABSTRACT

Presented are techniques of identifying, processing and displaying data point clusters associated with map information in an efficient manner Methods and systems are disclosed which process map information to identify clusters of requested data points for display, based on iterative clustering and filtering of the data points. Methods and systems are also disclosed which generate polygons representing the clusters. The amount of data to be processed and/or displayed can be reduced, without loss of any associated information content in a displayed map.

20 Claims, 14 Drawing Sheets

Related U.S. Application Data continuation of application No. 15/108,510, filed as application No. PCT/US2016/039202 on Jun. 24, 2016, now Pat. No. 10,415,987.

(51) Int. Cl.
*G01C 21/36* (2006.01)
*G06F 16/901* (2019.01)
*H04W 4/21* (2018.01)

(56) References Cited

U.S. PATENT DOCUMENTS

| | | | |
|---|---|---|---|
| 7,480,566 B2* | 1/2009 | Laverty | G01C 21/3679 701/426 |
| 9,489,754 B2* | 11/2016 | Arikan | G01C 21/3878 |
| 9,535,586 B2 | 1/2017 | Johnson et al. | |
| 2005/0159883 A1 | 7/2005 | Humphries et al. | |
| 2006/0200305 A1 | 9/2006 | Sheha et al. | |
| 2006/0259237 A1 | 11/2006 | de Silva et al. | |
| 2008/0120022 A1 | 5/2008 | Hayot et al. | |
| 2009/0009321 A1 | 1/2009 | McClellan et al. | |
| 2009/0234574 A1 | 9/2009 | Deng et al. | |
| 2011/0137551 A1 | 6/2011 | Peri | |
| 2012/0197524 A1 | 8/2012 | Beyeler et al. | |
| 2013/0328915 A1 | 12/2013 | Arikan et al. | |
| 2015/0281889 A1 | 10/2015 | Menendez | |
| 2015/0346968 A1 | 12/2015 | Johnson et al. | |

OTHER PUBLICATIONS

Luke Mahe et al: "Too Many Markers! Google Maps APIs, Google Developers", Dec. 31, 2010 (Dec. 31, 2010), XP055288759, Retrieved from the Internet: <https://developers.google.com/maps/articles/toomanymarkers#markermanager>.

Anonymous: "Highlight Areas in Google Maps", Jan. 19, 2012 (Jan. 19, 2021), XP055339167, Retrieved from the Internet: <http://googlesystem.blogspot.nl/2012/01/highlight-areas-in-google-maps.html>.

Osamu Masutani et al: "BEIRA: An Area-based User Interface for Map Services", World Wide Web; Internet and Web Information Systems, Kluwer Academic Publishers, DO, vol. 12, No. 1, Nov. 27, 2008 (Nov. 27, 2008), pp. 51-68, XP019691171, ISSN: 1573-1413.

Filip Bec: "A blazingly fast open source algorithm for POI clustering on IOS", Sep. 16, 2014 (Sep. 16, 2014), XP055238460, Retrieved from the Internet: <https://infinum.co/the-capsized-eight/articles/a-blazingly-fast-open-source-algorithm-for-poi-clustering-on-ios>.

International Search Report and Written Opinion for PCT Application No. PCT/US2016/039202, dated Feb. 6, 2017.

Written Opinion of the International Preliminary Examining Authority for PCT Application No. PCT/US2016/039202, dated Sep. 7, 2018. 6 pages.

International Preliminary Report on Patentability for PCT Application No. PCT/US2016/039202, dated Nov. 30, 2018. 16 pages.

Examination Report for European Patent Application No. 16738931.1 dated Mar. 10, 2020. 5 pages.

Examination Report for European Patent Application No. 16738931.1 dated Oct. 29, 2020. 7 pages.

First Office Action for Chinese Patent Application No. 201680085159.5 dated May 13, 2021. 6 pages.

Yu et al. Acquisition and Processing of Interest Point Data of the Urban Public Map Service. Mar. 31, 2013. Geomatics & Spatial Information Technology, vol. 36(3), pp. 75-76. English translation of abstract only.

Yu. Trajectory Data Mining: An Overview. May 12, 2015. ACM Transactions on Intelligent Systems and Technology, Association for Computing Machinery Corporation, vol. 6(3). 2 Penn Plaza, Suite 701 New York, NY 10121-0701, USA. DOI: 10.1145/2743025, pp. 1-41.

Summons to Attend Oral Proceedings for European Patent Application No. 16738931.1 dated Jun. 22, 2021. 9 pages.

\* cited by examiner

IDENTIFYING, PROCESSING AND DISPLAYING DATA POINT CLUSTERS

CROSS-REFERENCE TO RELATED APPLICATIONS

The present application is a continuation of U.S. patent application Ser. No. 16/533,202, filed on Aug. 6, 2019, which is a continuation of U.S. patent application Ser. No. 15/108,510, filed on Jun. 27, 2016, which is a national phase entry under 35 U.S.C. § 371 of International Application No. PCT/US2016/039202, filed Jun. 24, 2016, all of which are incorporated herein by reference.

BACKGROUND OF THE INVENTION

Various browser-based systems permit users to enter the name of a geographic location and receive a map of the location in response. In addition to the showing roads and the names of the roads, such maps may also show and highlight building footprints. These systems may also permit users to search for categories of businesses in the area, and display markers on the map identifying the locations of matching businesses.

In certain geographic locations, such as urban areas, the number of markers to be displayed can be very large, due to a high density of points of interest, such as businesses. There is a need to process such information efficiently in order to enable map information to be rendered and displayed quickly, while respecting underlying hardware and software constraints associated with the technology used to display the map information.

BRIEF SUMMARY OF THE INVENTION

Embodiments of the present invention relate to techniques of identifying, processing and displaying data point clusters associated with map information in an efficient manner. Embodiments particularly relate to methods and systems for processing map information to identify clusters of requested data points for display, based on iterative clustering and filtering of the data points, and to methods and systems for generating polygons representing the clusters.

An improvement in the manner in which map information is processed and displayed rendered can optimise resources on computer systems such as servers and user terminals, freeing up resources to run other applications and processes. Particularly in portable devices, in which storage and power resources are limited, an improvement in the way in which map information is processed and displayed can cause the time for which a display is active, while map information is processed, to be reduced, ensuring that power is saved, and that a user's requirements are met more quickly. Processing map information efficiently can also result in an improvement in communication between a user terminal and a server hosting the map information, since the information to be communicated to the terminal can be optimised.

Techniques described with references to embodiments of the invention can enable one or more of such benefits through using point of interest information in an efficient manner so that the amount of data to be processed and/or displayed can be reduced, without loss of any associated information content in a displayed map. Through appropriate clustering and filtering of data points, certain data points can be eliminated from consideration, while the clustering process enables geographical regions of a map to be processed collectively. Generating polygons to represent such regions enables data within the polygon to be processed collectively.

DETAILED DESCRIPTION

Overview

The technology relates to generating and displaying a map of geographic regions based on the proximity of points of interest (POI) along road segments. For instance, a map may be represented by a graph such that each node represents an intersection, each edge represents a road segment connected to an intersection, and each edge is assigned a score based on a certain criteria. By way of example, the criteria may be based on the road segment's total number of POI (e.g., restaurants), a score assigned to POI on a road segment, the density of the road segment's POI relative to its physical length, the physical distance of the segment's POI relative to an intersection, and a score assigned to neighboring segments. The graph may be iteratively filtered until small clusters of road segments are identified. The clusters may be displayed to users by outlining the associated segments and the footprint of POI that are within a threshold distance of the segment.

Figure 1:
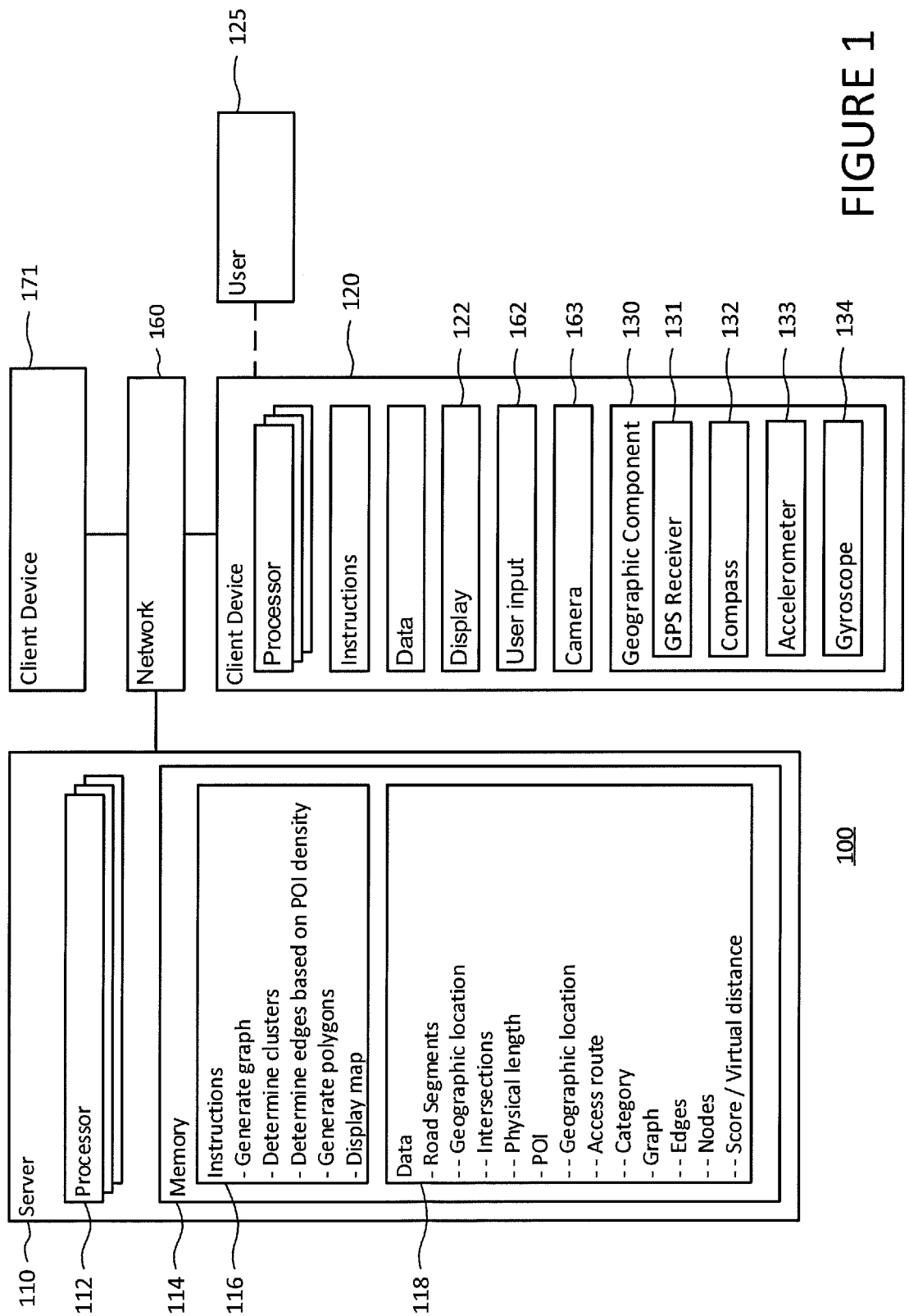
FIG. 1 is a functional diagram of a system in accordance with aspects of the disclosure.
Figure 3:
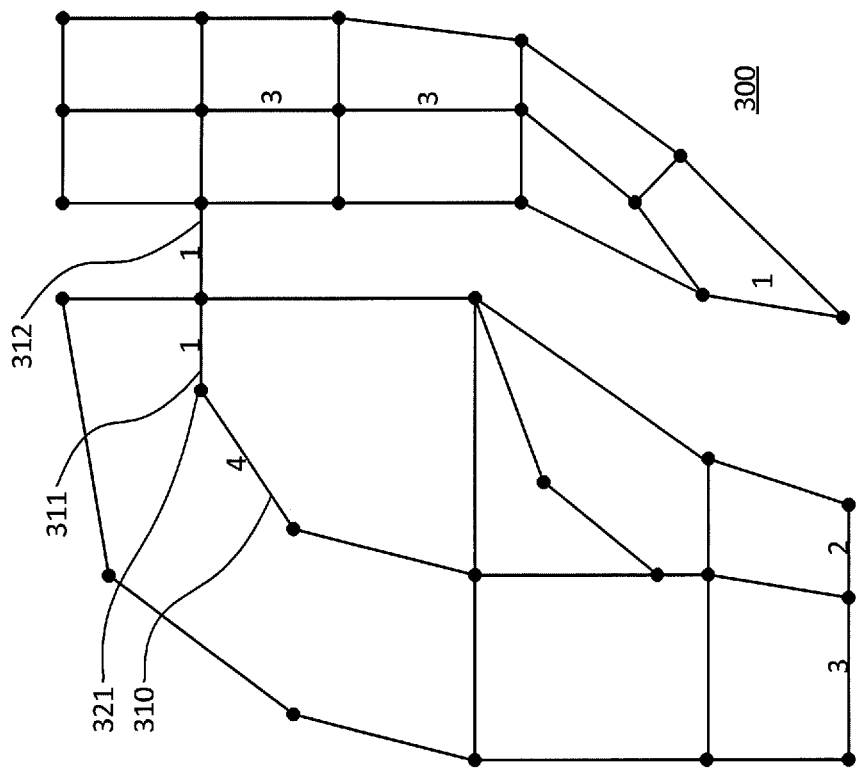
FIG. 3 is an example of a graph of the road segments of a map.
Figure 2:
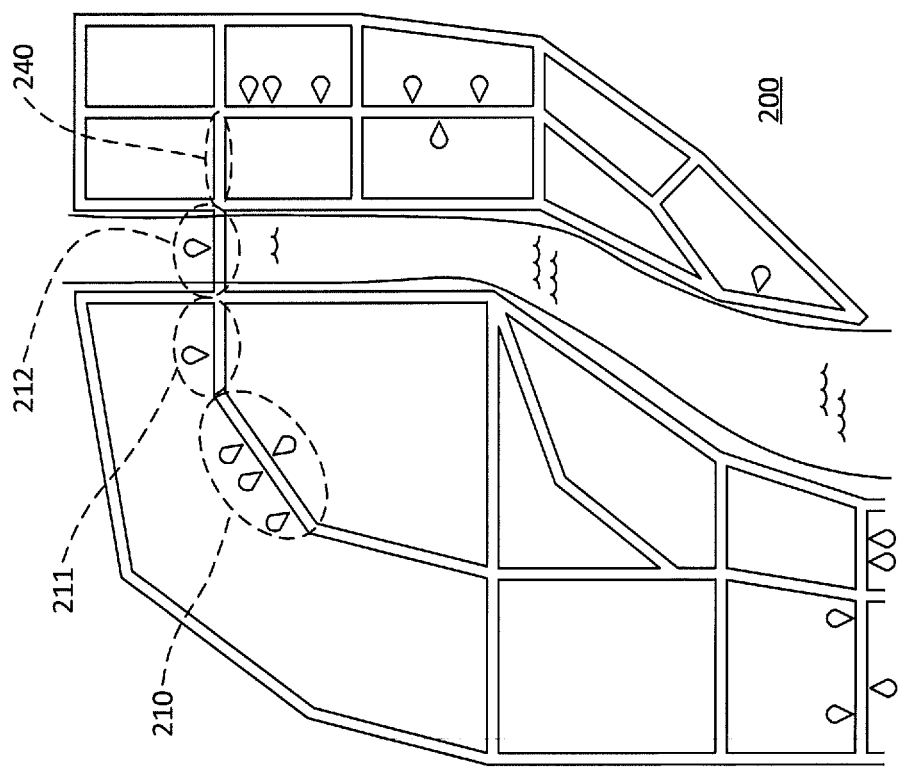
FIG. 2 is an example of a map.

By way of illustration, FIG. 2 shows a map of road segments and POI that may be stored in the memory of a system such as that shown in FIG. 1. As shown in FIG. 3, the map may be modelled by a graph, where each edge represents a road segment and each node represents the intersection of one or more road segments with another road segment. Each edge may be initially assigned a score that is a based on information specific to the POI on that road segment, e.g., the number of POI located on the road segment and their ranking of those POI relative to others.

Figure 4:
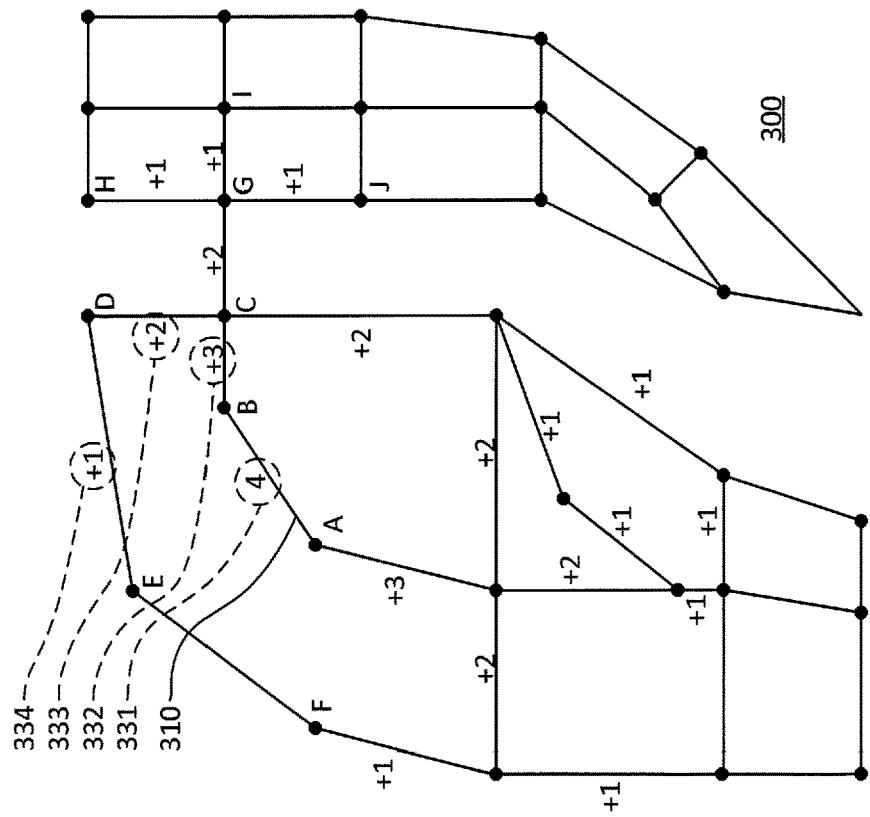
FIG. 4 is an example of scores that are determined based on information specific to the edge.

The score assigned to a road segment also may be based on the score of an adjacent segment. As shown in FIG. 4, a portion of the score of edge AB may be added to adjacent edge BC, and a still smaller portion may be added to the edges that are adjacent to edge BC. In that regard, the POI-based score of a road segment may diffuse to direct and indirect neighbors of the segment.

Figure 5:
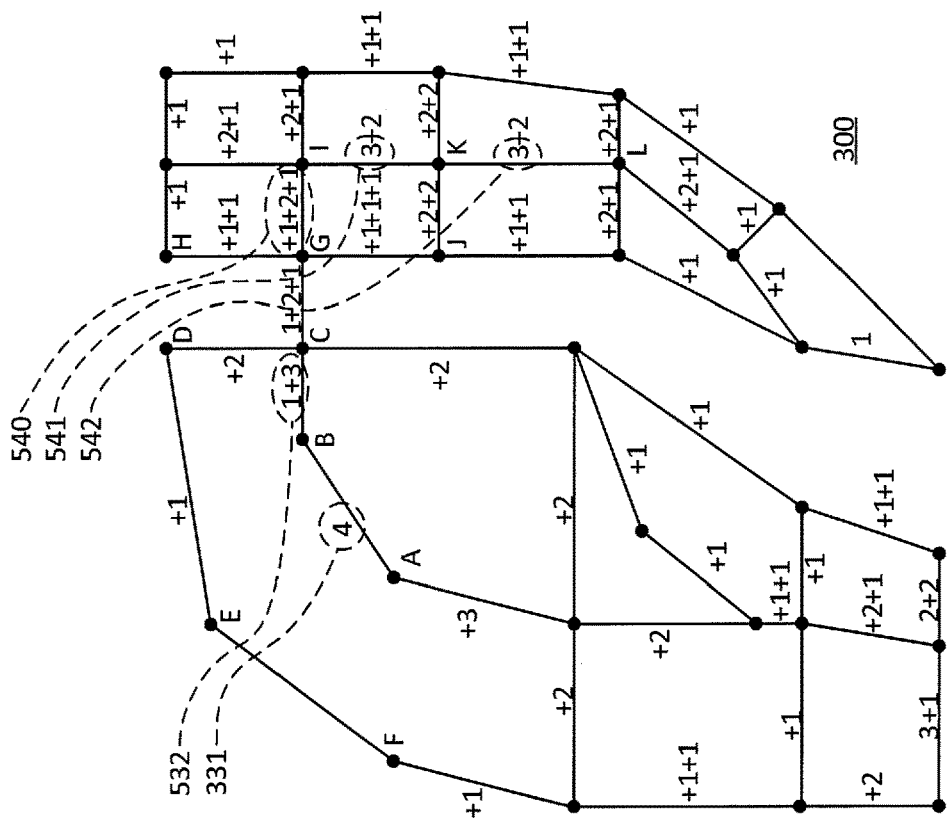
FIG. 5 is an example of scores that are determined based on information related to multiple edges.
Figure 6:
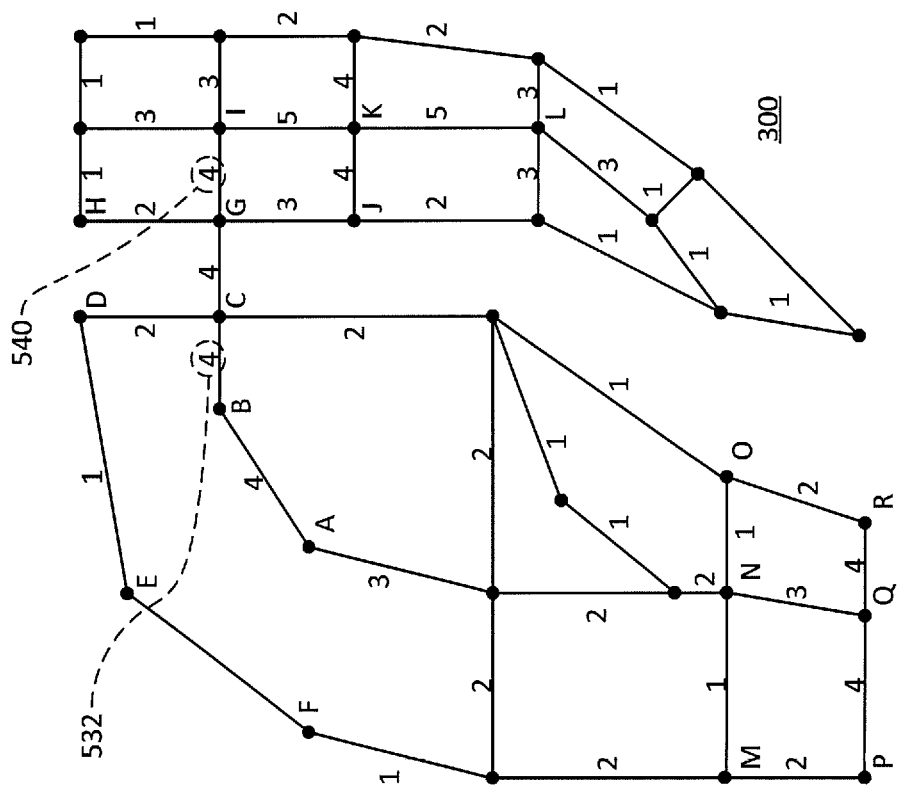
FIG. 6 is an example of the graph prior to filtering.

Indeed, the score assigned to a road segment may be based on many other road segments. For example and as shown in FIG. 5, as each edge's initial score is diffused to other segments, an increasingly diminishing portion of that score may be added to indirectly-adjacent edges until there is nothing left to add. As a result, a single edge's score may be updated multiple times if the edge is adjacent to multiple edges with relatively high scores. FIG. 6 shows the total score of each segment.

Figure 7:
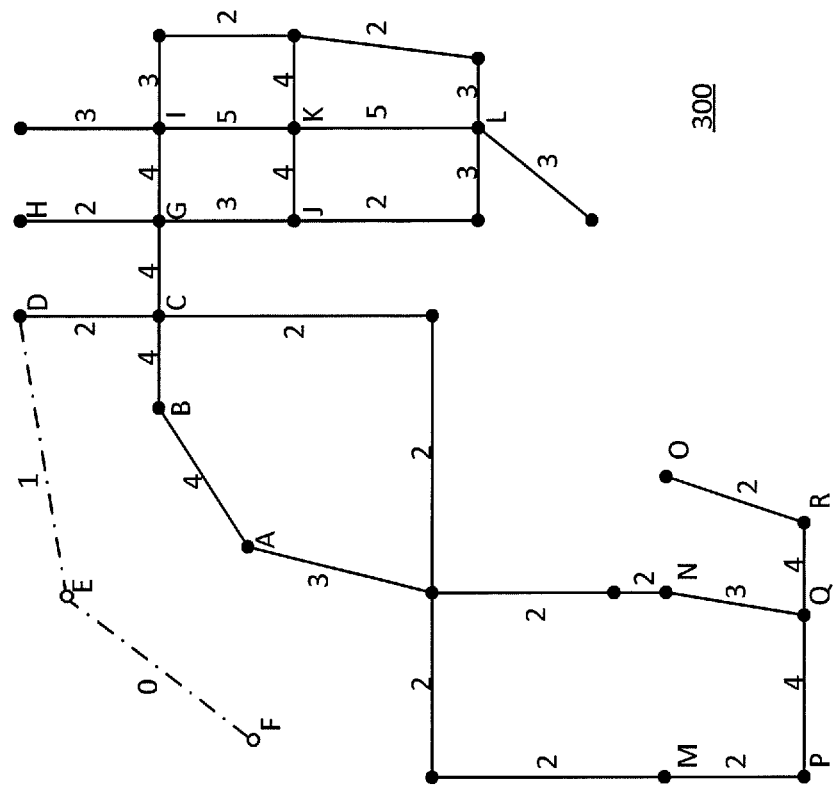
FIG. 7 is an example of the graph after initial filtering.
Figure 8:
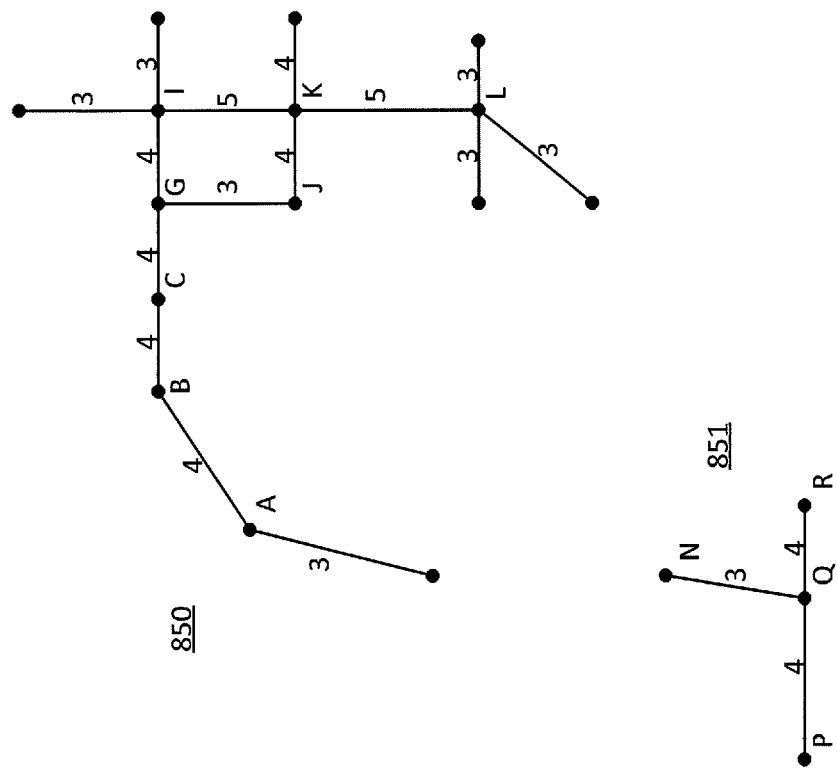
FIG. 8 is an example of the graph after additional filtering.

The graph of the map may be filtered based on a variety of criteria. For instance, the criteria may be based at least in part on characteristics that are specific to a single road segment, such as discarding edges with scores below a threshold. The discarding of edges may iteratively continue with increasingly large thresholds, which may eventually cause the graph to model clusters of connected road segments that are disconnected from the other represented in the graph. By way of example, FIGS. 7 and 8 illustrate clusters that formed as a result of iteratively raising the threshold.

The graph may also be filtered based on criteria that depend on the characteristic of more than one segment. For instance, the cluster may be iteratively filtered until the size of the cluster is less than an area-based threshold. By way of example and as shown in FIG. 8, if a cluster is required to be ten segments or smaller, then cluster 851 would satisfy the threshold and be excluded from additional filtering like that described above. However, because cluster 850 has more than ten segments, it would continue to be filtered until it reaches the size shown in FIG. 9.

Figure 10:
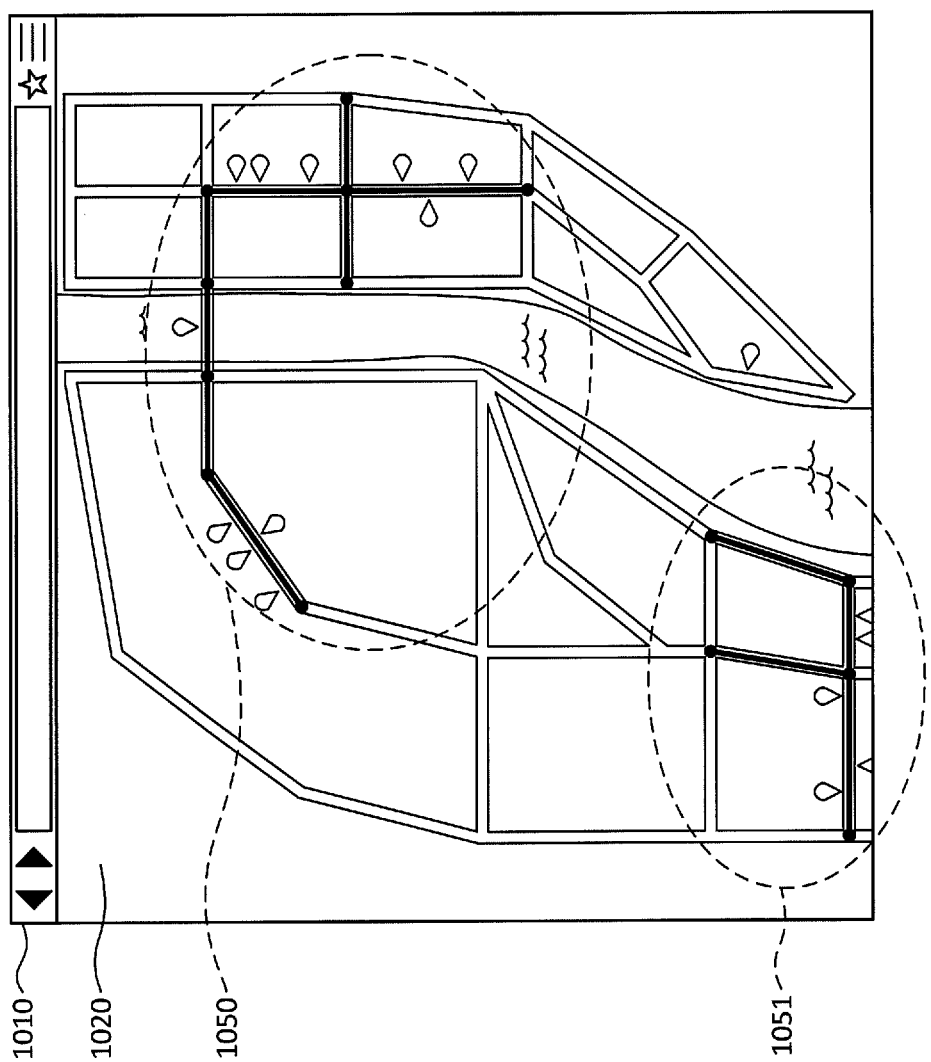
FIG. 10 is an example of displaying the road segments associated with clusters.

The filtered graph represents a clustered map. FIG. 10 provides an example how a clustered map containing one or more clusters may be shown to a user.

Figure 11:
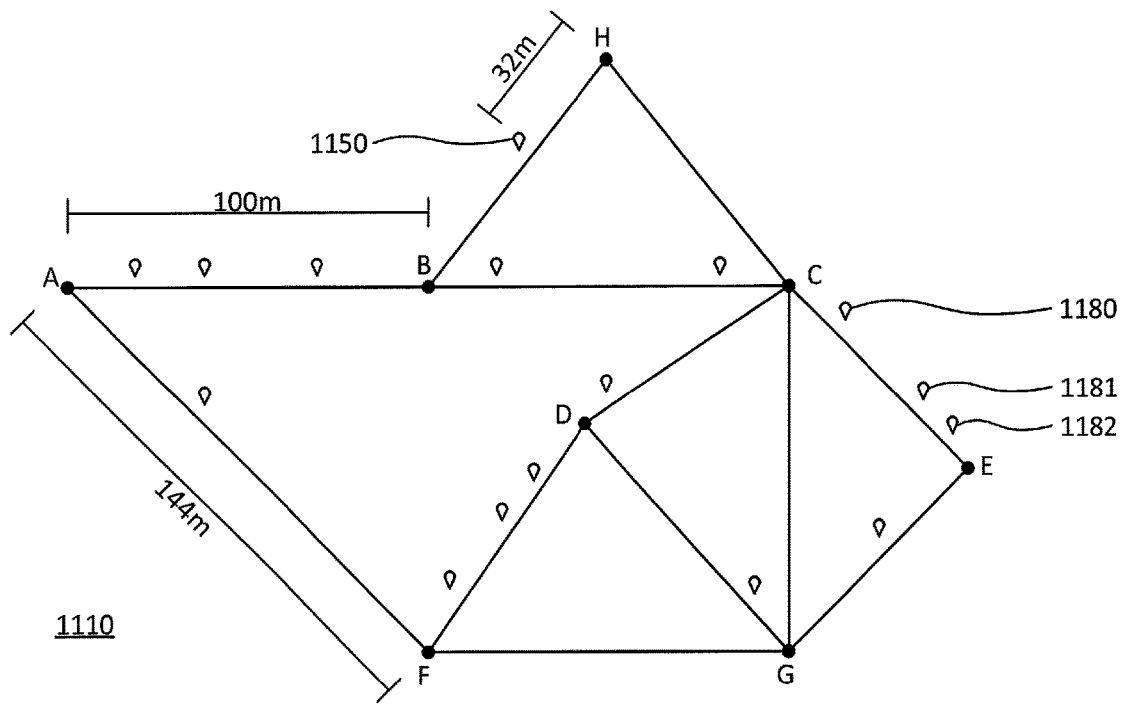
FIG. 11 is another example of a graph of road segments.

Each cluster of segments may be further filtered based on the physical locations of the POI relative to road segments, intersections and each other. FIG. 11 shows a graph where the location of the edges, nodes and POI markers in the graph are in scale relative to the geographic locations of the associated road segment, road intersections and POI.

Figure 12:
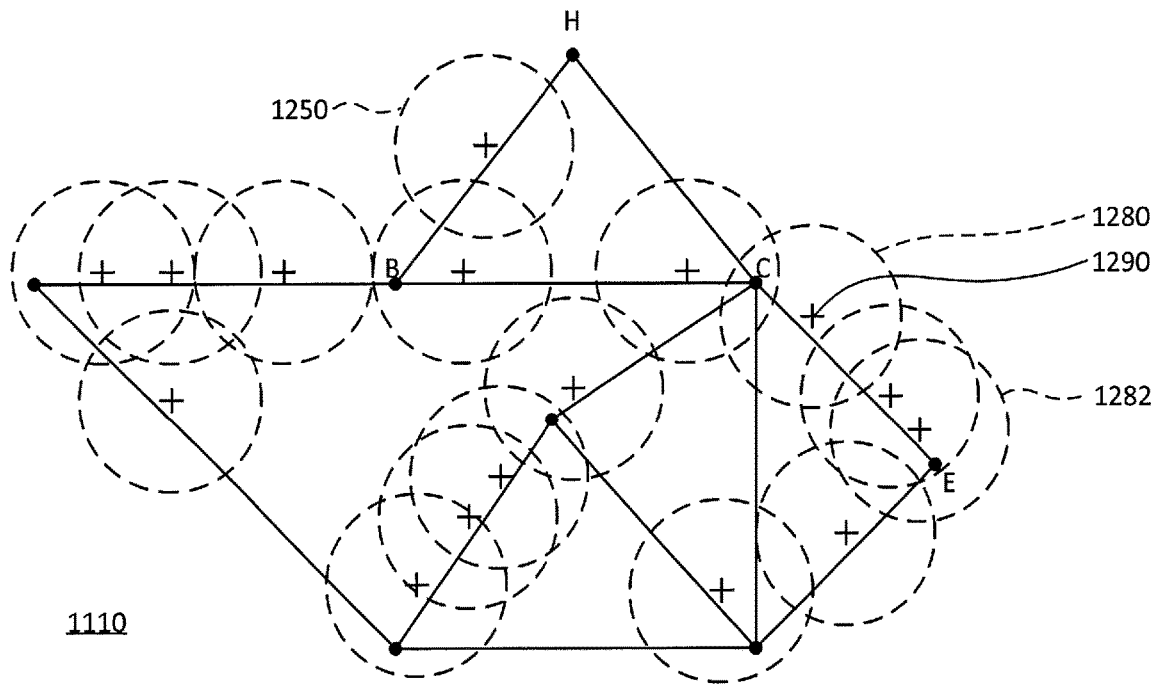
FIG. 12 is an example of filtering edges based on physical proximity of POI.

One of the criteria for further filtering may prune segments based on the geographic location of POI relative to intersections. As shown in FIG. 12, if there are no POI within a threshold distance of an intersection, then all of the edges that are connected to the intersection's associated node may be removed from the graph.

Figure 13:
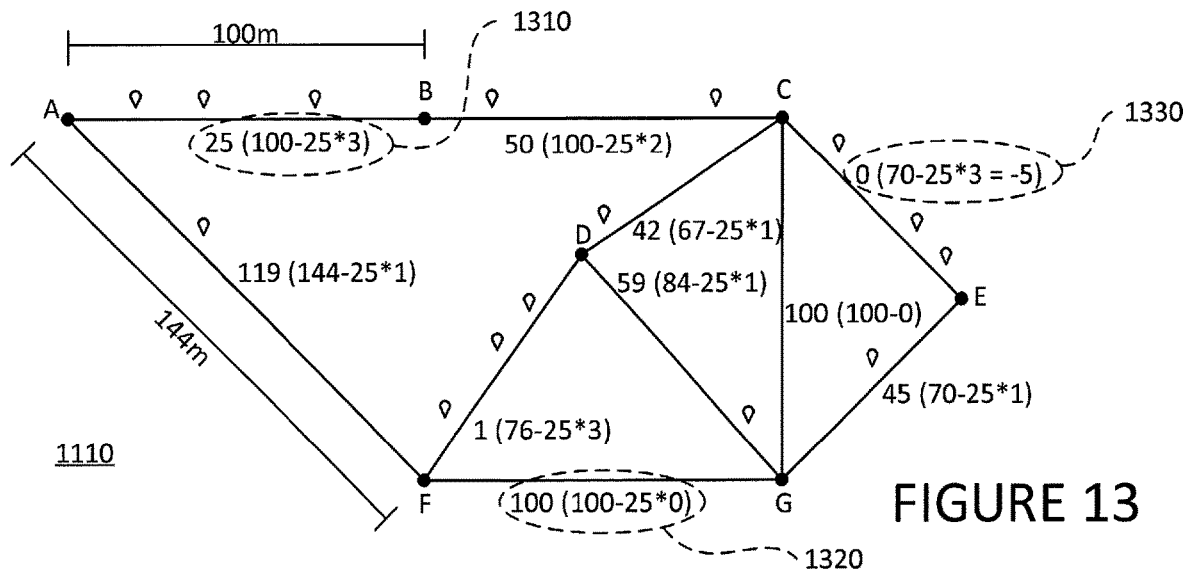
FIG. 13 is an example of determining a score based on the physical density of POI.
Figure 14:
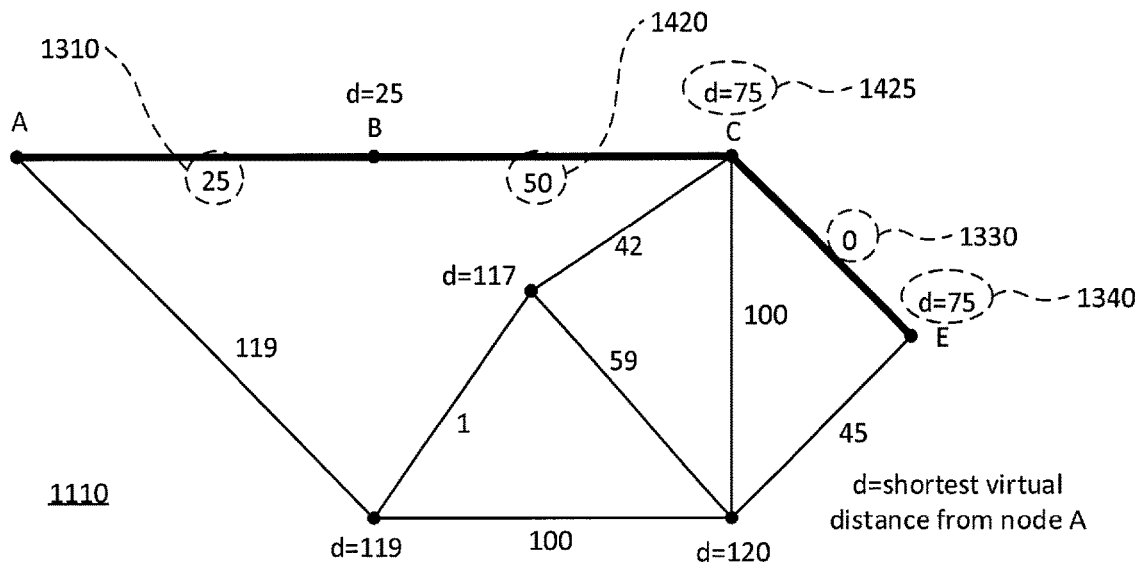
FIG. 14 is an example of determining a shortest path between a pair of nodes.
Figure 15:
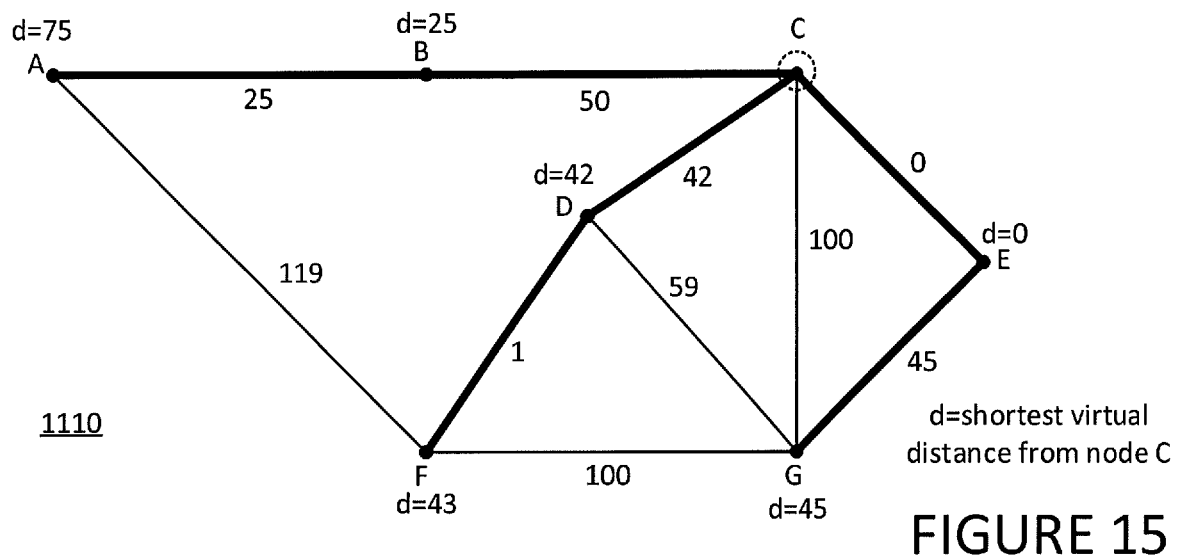
FIG. 15 is an example of determining a shortest path between any pair of nodes.
Figure 16:
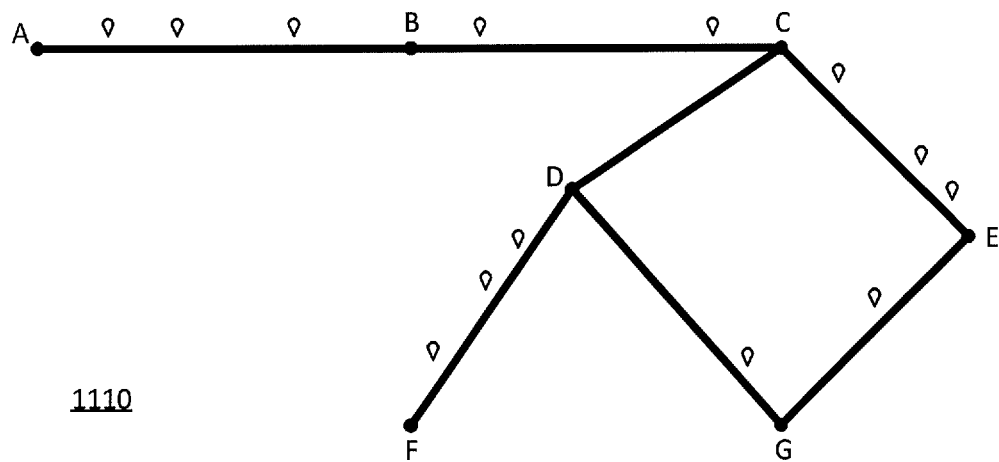
FIG. 16 is an example of the graph of FIG. 11 after filtering based on physical proximity and density of POI.

Another criteria for pruning may be based on the density of a road segment's POI relative to the physical length of the segment. For instance and as shown in FIG. 13, a virtual length value may be calculated for each edge based on the physical length of the edge's associated segment and the number of POI located on the segment. The virtual distance between pairs of intersections may be used to prune additional road segments from the cluster. For example, the system may determine the shortest path from each node to every other node based on the edge's virtual lengths, and any edge that does not lie along at least one of those paths may be removed from the graph. In that regard, FIG. 14 illustrates the shortest path between nodes A and E and FIG. 15 illustrates the shortest path between a node C and every other node. FIG. 16 illustrates how the graph would appear when any edge that is not on the shortest path between at least one pair of nodes is removed.

Figure 17:
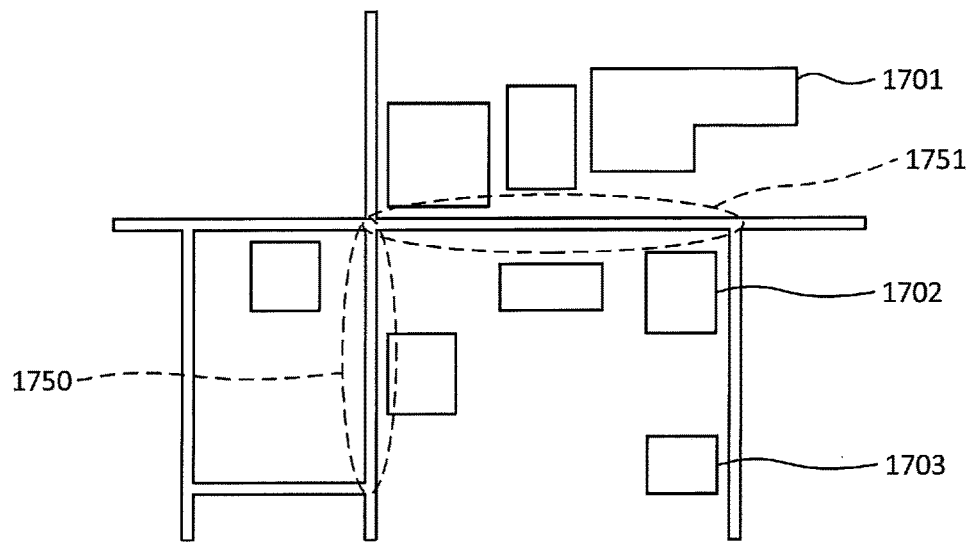
FIG. 17 is an example of a map, including building footprints.
Figure 18:
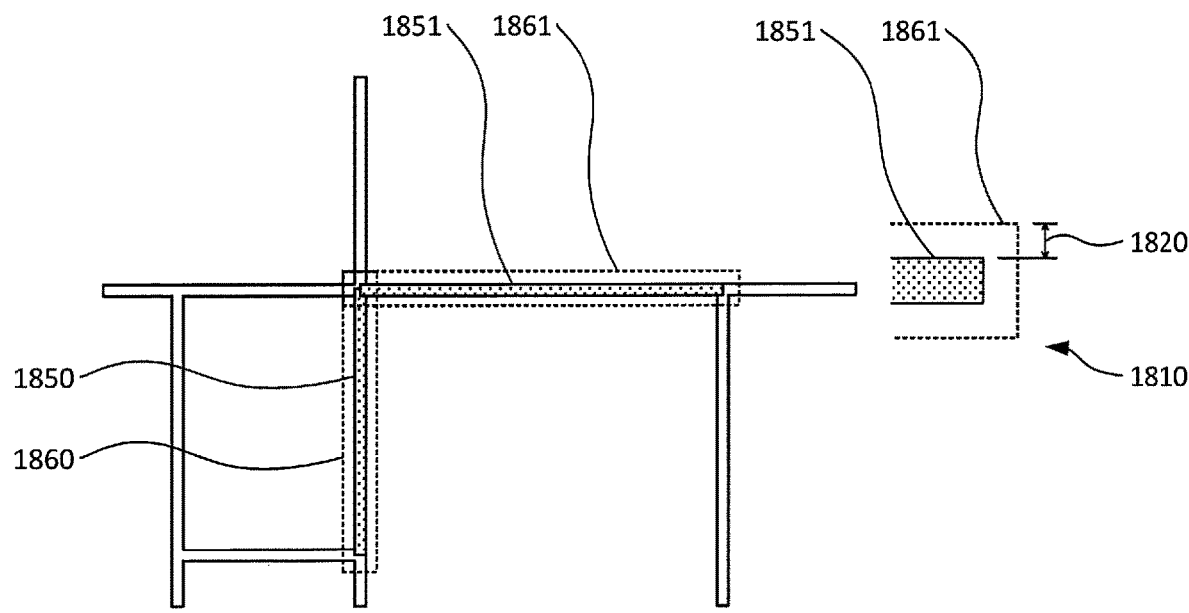
FIG. 18 is an example of polygons generated based on road segment footprints.

Clusters of road segments may be used to identify and display regions that may be of interest to users. FIG. 17 illustrates a map where road segments 750-51 were identified as a result of the aforementioned filtering and pruning. As shown in FIG. 18, a polygon may be generated for each of those segments, wherein each edge of each polygon is a fixed distance away from an edge of the segment's footprint.

Figure 19:
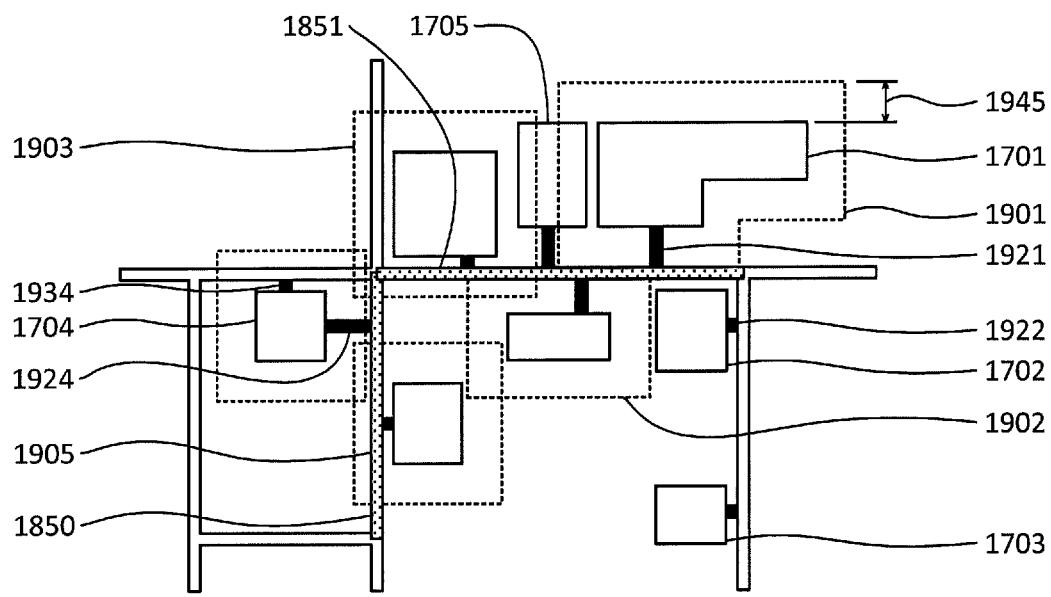
FIG. 19 is an example of polygons generated based on building footprints.

A polygon may also be generated for each building having a characteristic that is associated with one of the segment. For example and as shown in FIG. 19, a polygon may be generated for any building having an access route on the segment (e.g., a door or driveway) and contains a POI meeting certain criteria (e.g., the category used to select the POIs described in connection with FIG. 2). The edge of the polygons may be a fixed distance away from the edges of the footprint of the relevant building.

Figure 20:
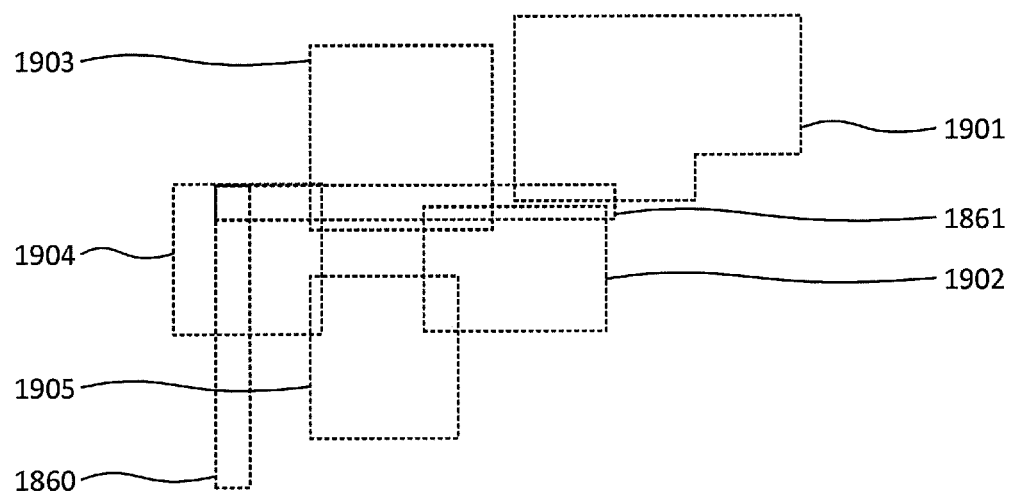
FIG. 20 is an example of polygons generated based on road segment and building footprints.
Figure 21:
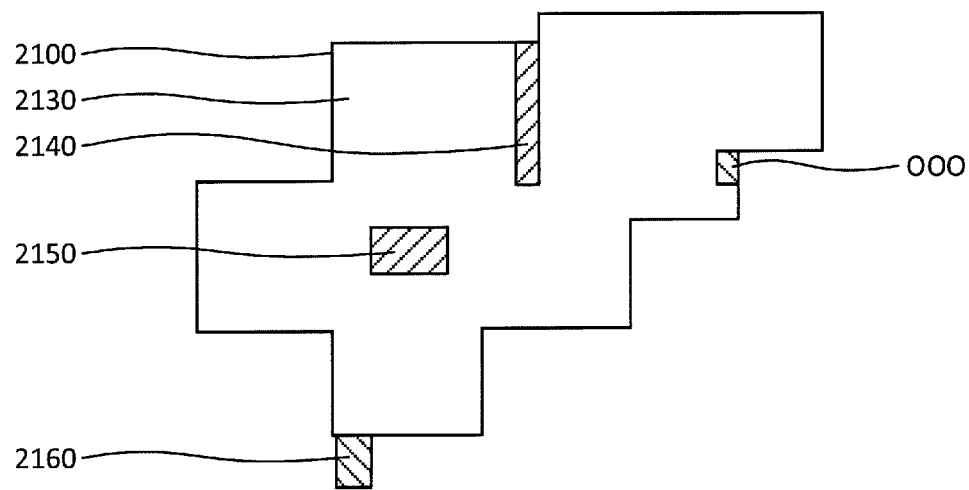
FIG. 21 is an example of a polygon generated based on the polygons of FIGS. 19 and 20.

As shown in FIGS. 20 and 21, all of the building-specific polygons that intersect a segment-specific polygon may be selected and combined with the segment-specific polygons to form one large polygon. As shown in FIG. 21, holes inside the polygon and narrow spaces on the edge of the polygon may be filled in and small protrusions on the outer edge may be removed.

Figure 22:
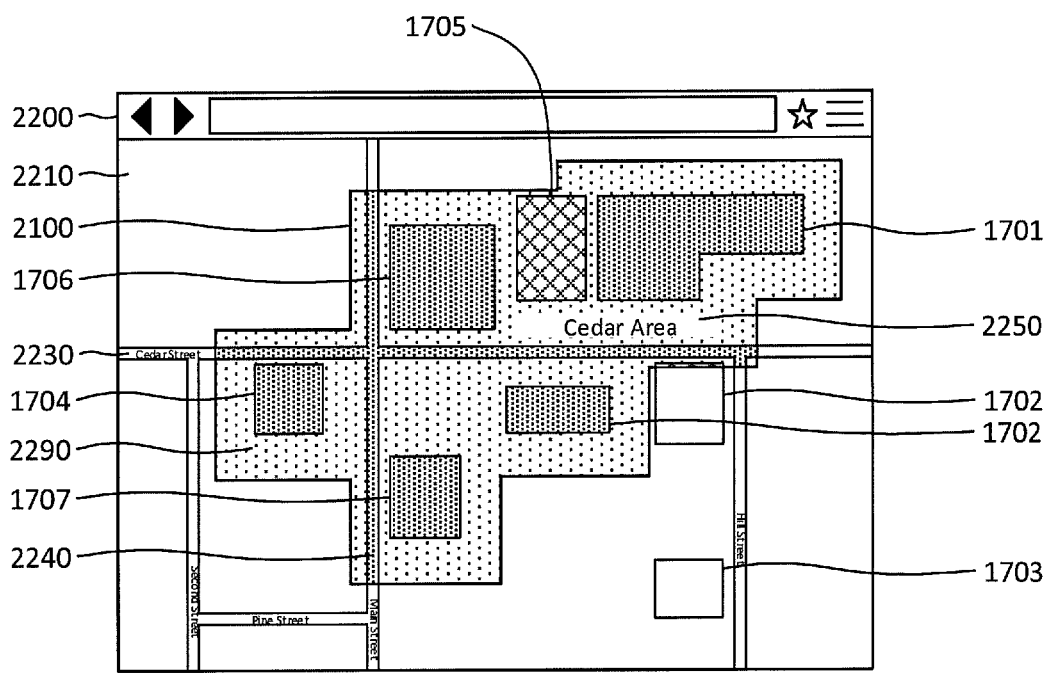
FIG. 22 is an example of displaying the polygon of FIG. 21 on a map.

As shown in FIG. 22, the polygon may be displayed to a user on a map, thus highlighting a region containing a relatively dense population of POI that may be of interest to the user. A name for the region may be determined and displayed by selecting the name of the town or neighborhood in which the region appears, a category that was used to select the POIs, a category of business that is common in that region, or by selecting the name of the longest road.

Example Systems

FIG. 1 illustrates one possible system 100 in which technology disclosed herein may be implemented. In this example, system 100 may include computing devices 110 and 160. Computing device 110 may contain one or more processors 112, memory 114 and other components typically present in general purpose computing devices. Although FIG. 1 functionally represents each of the processor 112 and memory 114 as a single block within device 110, which is also represented as a single block, the system may include and the methods described herein may involve multiple processors, memories and devices that may or may not be stored within the same physical housing. For instance, various methods described below as involving a single component (e.g., processor 112) may involve a plurality of components (e.g., multiple processors in a load-balanced server farm). Similarly, various methods described below as involving different components (e.g., device 110 and device 120) may involve a single component (e.g., rather than device 120 performing a determination described below, device 120 may send the relevant data to device 110 for processing and receive the results of the determination for further processing or display).

Memory 114 of computing device 110 may store information accessible by processor 112, including instructions 116 that may be executed by the processor. Memory 114 may also include data 118 that may be retrieved, manipulated or stored by processor 112. Memory 114 may be any type of storage capable of storing information accessible by the relevant processor, such as media capable of storing non-transitory data. By way of example, memory 114 may be a hard-disk drive, a solid state drive, a memory card, RAM, DVD, write-capable memory or read-only memory. In addition, the memory may include a distributed storage system where data, such as data 118, is stored on a plurality of different storage devices which may be physically located at the same or different geographic locations.

The instructions 116 may be any set of instructions to be executed by processor 112 or other computing device. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 112 may be any conventional processor, such as a commercially available CPU. Alternatively, the processor may be a dedicated component such as an ASIC or other hardware-based processor.

Data 118 may be retrieved, stored or modified by computing device 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 160 and capable of directly and indirectly communicating with other nodes of network 160. Although only a few computing devices are depicted in FIG. 1, a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 120 via the network 160. Computing device 120 may be a client computing device, and server 110 may display (or provide for display) information by using network 160 to transmit and present information to a user 125 of device 120 via display 122. Although certain advantages are obtained when information is transmitted or received as noted above, other aspects of the subject matter described herein are not limited to any particular manner of transmission of information.

Computing device 120 may be configured similarly to the server 110, with a processor, memory and instructions as described above. Computing device 120 may be a personal computing device intended for use by a user and have all of the components normally used in connection with a personal computing device such as a central processing unit (CPU), memory storing data and instructions, a display such as display 122 (e.g., a monitor having a screen, a touch-screen, a projector, a television, or other device that is operable to display information), user input device 162 (e.g., a mouse, keyboard, touchscreen, microphone, etc.), and camera 163.

Computing device 120 may also be a mobile computing device capable of wirelessly exchanging data with a server over a network such as the Internet. By way of example only, device 120 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. In that regard, some of the instructions executed during the operations described herein may be provided by the operating system whereas other instructions may be provided by an application installed on the device. Computing devices in accordance with the systems and methods described herein may include other devices capable of processing instructions and transmitting data to and from humans and/or other computers including network computers lacking local storage capability and set top boxes for televisions.

Computing device 120 may include a component 130 to determine the geographic location and orientation of the device. For example, the component may contain circuits such as a GPS receiver 131 to determine the device's latitude, longitude and altitude position. The component may include software for determining the position of the device based on other signals received at the client device 120, such as signals received at a cell phone's antenna from one or more cell phone towers if the client device is a cell phone. It may also include a magnetic compass 132, accelerometer 133 and gyroscope 134 to determine the direction in which the device is oriented.

The server may store map-related information, such as the names and locations of roads. The location of a road may be stored as one or more road segments, where each segment represents a road, or a portion of road, that extends between two geographic locations. For example, if a road named "Main Street" intersected roads named "First Street", "Second Street" and "Third Street", respectively, the portion of Main Street extending between First Street and Second Street may be stored as one segment and the portion of Main Street extending between Second Street and Third Street may be stored as another segment. An individual road segment may be stored in memory as a series of smaller road segments. For instance, if the segment of Main Street extending between the intersection with First Street and Second Street is curvy, that segment may be stored as a series of linear road segments, where each linear road segment is defined by a pair of latitude/longitude positions located on the road. The segment between First Street and Second Street may also be stored as a series of parabolic road segments, where each parabolic road segment is defined by three latitude/longitude positions located on the road. Road segments may optionally represent other geographically-oriented pathways, such as a pedestrian-only trail.

The map-related information may include points of interest (POI), such as a restaurant, business, building, park, lake or any other item of potential interest to users that is associated with a geographical location. In addition to the POI's name and location, the system may associate a POI with one or categories (e.g., "Restaurant").

Locations may be stored in memory using one or more reference systems, e.g., latitude/longitude positions, street addresses, street intersections, an x-y coordinate with respect to the edges of a map (such as a pixel position when a user clicks on a map), building names, and other information in other reference systems that is capable of identifying a geographic location (e.g., lot and block numbers on survey maps). A geographic location may also be stored as a range of the foregoing (e.g., the location of a city may be defined by the geographic position of its borders) and the system may translate locations from one reference system to another. For example, server 110 may access a geocoder to convert a location stored as a street address into a latitude/longitude coordinate (e.g., from "1500 Amphitheatre Parkway, Mountain View, CA" to "37.423021°, −122.083939°").

The system may also store information from which the footprint of a geographically-located object may be determined. For example, the server may store a building's footprint as a polygon whose vertices correspond with specific latitude/longitude positions. Footprints may also be determined based on one or more assumptions. By way of example, if the system only has access to the latitude/longitude of a road segment's endpoints, the system may determine that the footprint of the road segment is a rectangle that extends between the two endpoints and is as wide as a typical two-lane road.

The system may also indicate whether a building has an access route to a road segment. For example, data 118 may indicate that a building has a public entrance that is facing and within a certain distance of a particular road segment (in which case an access road to the road segment might be assumed) or that there is a sidewalk between a particular road segment and a public entrance.

Example Methods

A method of determining, and displaying a map of, a commercial, geographic region of interest to users will now be described. It should be understood that the following operations do not have to be performed in the precise order described below. Rather, various steps can be handled in different order or simultaneously.

The geographic region may be within a larger geographic area identified by the system. For instance, server 110 may receive a request for information about a specific town from user 125 via client device 120. Server 110 may also identify the geographic area by iteratively selecting and processing towns stored in data 118.

The system may retrieve map information associated with the geographic area to be processed. FIG. 2 provides a map as an example of such an area. In that regard, map 200 is composed of interconnected road segments such as segments 210-212.

The map information may include the location and categories of POI within the area. Geographic areas containing a relatively high concentration of restaurants that are within walking distance from other each are often popular with users. Therefore, the system may identify the region of interest based on POI that are associated with the restaurant category. The locations of restaurants are shown in map 200 as teardrop shapes. Map 200 thus indicates that there are four restaurants located on segment 210, one restaurant located on segment 211 and one restaurant located on segment 212. Another category of POI may include consumer-oriented shops.

The system may generate a graph based on the map information wherein each edge represents a road segment and each node represents the intersection of one or more road segments with another road segment. In that regard, edges 310, 311 and 312 in FIG. 3 represent road segments 210, 211 and 212, respectively, and node 321 represents the intersection of road segment 210 and road segment 211.

Each edge of the graph may be associated with a score value that is based on the number of POI located on the associated road segment. For example, the edges of 310, 311 and 312 may be initially assigned a score of 4, 1 and 1 based on the number of restaurants located on road segments 210, 211 and 212, respectively. (For ease of reference, the remaining figures mostly refer to the nodes and the edges by letter instead of reference numbers.) A POI may be considered to be located on a segment only when it has an access route to the segment. Additionally or alternatively, a POI may be considered to be located on a segment when it is within a threshold distance of the segment or has a street address that is within the range of address numbers associated with the segment.

The total score may also depend on the score assigned to individual POI. For instance, restaurants appearing higher in a search for all restaurants in the area may be assigned a higher score than other restaurants, in which case road segments with equal numbers of restaurants may initially have unequal scores.

The score assigned to a road segment may also be based on the score of an adjacent segment. As noted above, score 331 of edge 310 (hereafter, edge "AB") may be initially assigned a value of 4 because there are 4 POI located on road segment 211. Because edge AB directly intersects with edge BC at node B, a portion of the initial score of edge AB may be added to the score of edge BC. For example, a value that is one less than the score 331 of edge AB may be added score 332 of edge BC, i.e., the value of score 332 may be increased by 3. Edge CD directly intersects edge BC at node C, so score 333 of edge CD may be increased as well, but by an amount that is less than the increase to edge BC. By way of example, since score 331 of edge BC was increased by 3, score 333 of edge CD may be increased by 2. A portion of that increase is added, in turn, to adjacent edge DE, e.g., score 334 of edge ED may be increased by 1. The amount of the increases attributable to the original source edge may continue to decline until there is nothing left to increase. For example, the score of edge EF is not increased because subtracting 1 from the increase to edge ED (+1) equates to an increase of 0.

Any edge that is adjacent to an edge having a score that was updated may have its score updated as well. As a result, the changes from a single edge may diffuse throughout the graph. As shown in FIG. 4, the scores of edges CG, GH, GI, CJ are also increased because of the score assigned to edge AB.

The score associated with a road segment may thus be based on not only the number of the POI located on the segment but the number of the POI located on many other segments. For example and as shown in FIGS. 5 and 6, score 532 of edge BC is based on the number of POI located on its associated segment (1) and the increase (+3) due to score 331 of adjacent edge AB, resulting in a total score of 4. Edge GI has no POI on its associated road segment (segment 240 of FIG. 2). Even so, score 540 of edge GI is relatively high because of increases of +1, +2 and +1 it received from initial scores 331, 541 and 542 assigned to edges AB, IK and KL, respectively.

In the foregoing example, the increase to a road segment due to a different road segment is directly and inversely proportional to the lowest number of road intersections between the two segments. However, the scores of adjacent edges may be adjusted in other ways as well. By way of example, the extent of the increase may decrease exponentially with each intersection, may be based on the lowest number of intersections on two different paths, and may be based on the physical distance between the segments.

Rather than selecting potentially-interesting segments based solely on their associated edges' initial and updated scores, the graph may also be filtered based on a variety of criteria.

That criteria may include characteristics that are specific to a single edge/segment. By way of example, the score of each edge may be compared to a predetermined threshold and discarded from the graph if it has a score below that threshold. FIG. 7 shows the result of removing any edges, such as edges DE and EF, that cannot satisfy the criteria "score≥2".

Such filtering of the graph may iteratively continue with increasingly large thresholds, which may cause the graph to eventually represent clusters of connected road segments that are disconnected from other clusters of connected road segments. By way of example and as shown in FIG. 8, two clusters of edges 850 and 851 may remain in the graph after edges that cannot satisfy criteria "score≥3" are discarded.

Figure 9:
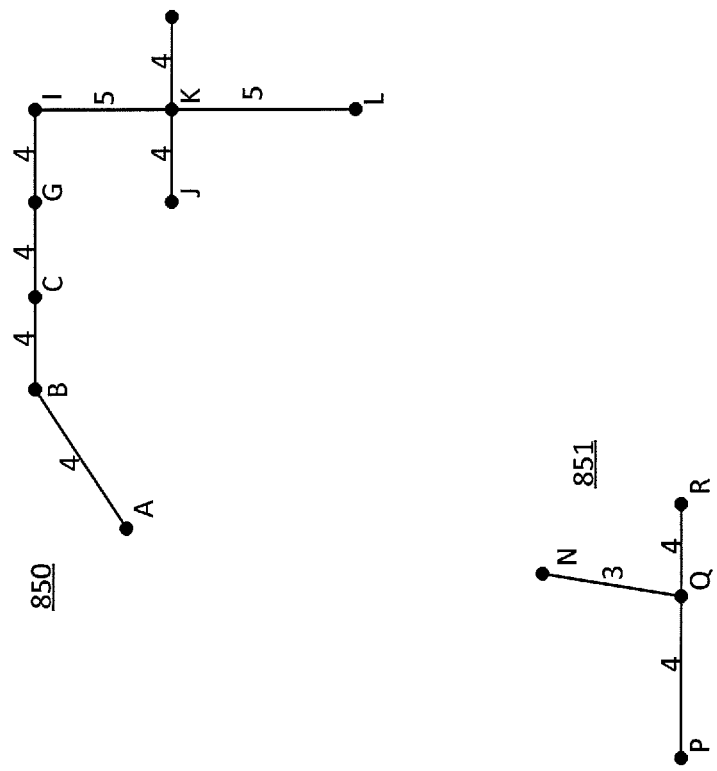
FIG. 9 is an example of clusters after additional filtering.

The graph may also be filtered based on criteria that depends on more than one segment. For instance, the aforementioned iterative filtering may continue until a cluster of edges reaches a particular size relative to an area-based threshold. By way of example and as shown in FIG. 8, if clusters are required to be ten segments or smaller, cluster 851 would satisfy the threshold because it only has three segments (PQ, QN, QR). As a result, cluster 851 would be excluded from additional filtering. Cluster 850, on the other hand, has more than ten segments so it would continue to be filtered, e.g., the segment-based threshold for cluster 850 may be increased to "score≥4". As shown in FIG. 9, cluster 850 thereupon satisfies the area-based criteria. The area-based threshold may also define a range. For example, if an increase in the threshold score causes a cluster to get too small, the entire cluster may be removed from the graph altogether.

In the foregoing example, the size of a road segment cluster is based on the total number of its associate edges. However, the size of a cluster may be determined in other ways as well. By way of example, the size may be based on the combined physical length of all segments, the number of segments in the shortest or longest non-overlapping path of segments, the physical length of the shortest or longest non-overlapping path of segments, the total hectares (acres) within a polygon defined by the geographic locations of the outermost intersections in the cluster, or combinations of the foregoing.

The filtered graph represents a clustered map that may be displayed to a user. FIG. 10 provides an example of how a clustered map containing one or more clusters may be shown to a user. Browser 1010 displays a map 1020 similar to the map described in connection with FIG. 2, but the map also includes a visual characteristic that identifies the clusters of segments 1050 and 1051 associated with graph clusters 850 and 851, respectively.

Each cluster of segments may be further filtered by pruning the graph based on the geographic locations of the POI relative to road segments, intersections and each other. By way of illustration, FIG. 11 shows a graph 1110 where the length of the edges, and the location of the nodes and associated POI, are roughly in scale relative to the geographic locations associated road segments, intersections and POI. For example, edge AB represents a first road segment that is 100 m long. Edge AF represents a second road segment that intersects with the first road segment, and the distance from that intersection to the next intersection is 144 m. Each teardrop shape represents a POI, e.g., the positions of POI indicators 1180-82 on graph 1110 relative to nodes C and E are to scale with respect to the geographic position of three POI on a road segment extending between the intersections associated with those nodes. By way of further example, the geographic distance from POI 1150 to the intersection represented by node H is 32 m.

One criteria for pruning may be based on the geographic location of POI relative to intersections. For instance, if there are no POI within a threshold distance of an intersection, then all of the edges that are connected to the intersection's associated node may be removed from the graph. By way of example, reference circle 1280 of FIG. 12 illustrates a threshold distance of 25 m (radius). Reference circle 1280 is centered around crosshair 1290, which corresponds with the location of POI 1180. As shown in the Figure, node C is within the 25 m threshold distance of cross hair 1290, i.e., the location of POI 1180. Therefore, there is at least one POI within a threshold distance of node C so node C survive pruning based on this particular criteria. The same is true with respect to reference circle 1281 (representing the area that is 25 m from the location of POI 1182) and node E. Since both nodes C and E survive pruning, edge CE does as well. Alternatively, edges may be pruned by determining a score based on the number of their POI that are within a threshold distance of an intersection and discarding edges with scores below a threshold.

On the other hand, there are no POI within the threshold distance of node H. As shown by reference circle 1250, the closest POI is POI 1150 and it is more than 25 m away from the intersection represented by node H. Therefore, node H and all of the edges connected to the node (e.g., edges BH and CH) are discarded from graph 1110.

The threshold distance may be selected based on the likelihood that pedestrians are willing to walk a particular distance when exploring different POI. In that regard and in at least some circumstances, the threshold distance is set to 50 m. The predetermined threshold may be determined based on data received by the system. For example, if pedestrian traffic data in a particular city indicates that pedestrians tend to walk longer distances per day than average, then the predetermined threshold distance associated with that city may be automatically set to a value that is proportionally greater than the average threshold set for other cities.

Another criteria for pruning may be based on the density of POI along a road segment. For instance and as shown in FIG. 13, a score associated with a segment may represent a virtual length value that is calculated for each edge based on the physical length of the edge's associated segment and the number of POI located on the segment. The value may be calculated in accordance with the function $V_s = \max(L - D * N, 0)$ where $V_s$ = virtual length of segment $S$, $\max(x, 0)$ = a function returning $x$ or 0, whichever is larger, $L$ = physical length of segment $S$, $D$ = a coefficient equal to (benchmark length)/(preferred minimum number of POI within the benchmark length), and $N$ = number of POI's located on segment $S$.

The values shown in FIG. 13 are based on a preferred minimum of 4 POI for each 100 m of road, i.e., D=100/4=25. By way of example, since there are three POI located on edge AB and the physical length associated with the edge is 100 m, the virtual length 1310 of AB=max(100-25*3, 0)=25. There are no POI located on edge FG, so its virtual length 1320 equals its physical length of 100 m. Edge CE is 70 m long and there are 3 POI located on it, which means edge CE has an average density of 4.2 POI every 100 m. This exceeds the preferred minimum of 4 POI for each 100 m of road and, as a consequence, the virtual distance 1330 of edge CE is zero.

The virtual distance between pairs of intersections may be used to prune road segments from the cluster. By way of example, the system may determine the shortest path from each node to every other node based on the edge's virtual lengths, and any edge that does not lie along at least one of those paths may be removed from the graph. As shown in FIG. 14, the virtual length 1310 of edge AB and the virtual length 1425 of edge BC is 50. Therefore, the virtual distance of node C from A via edges AB and BC is 75. The virtual length 1330 of edge CE is zero, so the total virtual distance 1340 of node C from A via edges AB, BC and CE is 75. The virtual length of any other path from node A to node E would be longer than 75. As a result, edges AB, BC and CE collectively represent the shortest path between nodes A and E and, as a result, those edges will not be discarded based on POI density.

FIG. 15 illustrates the shortest possible paths from node C to each of the other nodes in graph 1110. For example, the shortest path from node C to node F is along edges CD and CF. Edges AB, BC, CD, DF, CE and EG are also on the shortest path from node C to at least one other node, so they will not be pruned based on POI density. Standard all-pairs shortest path algorithms may be used to identify the shortest paths between all node pairs. Standard all-pairs shortest path algorithms may be used to identify the shortest paths between all node pairs.

FIG. 16 shows all of the edges that are on the shortest path from at least one node to any other node of graph 1110. Edges AF, CG, DG and FG were not on any of the shortest paths and were thus pruned from graph 1110. As a result, surviving edges AB, BC, CE, CD, EG and DF may represent road segments that collectively identify a geographic region of particular interest to pedestrians based on POI.

By reducing the size of clusters, the system may decrease the likelihood that a cluster will represent a ball of non-commercial (e.g., residential) road segments around a core of commercial road segments, or a single cluster will include two separate commercial regions that are connected through a non-commercial region. On the other hand, by initially diffusing scores as described above, the system may decrease the likelihood that clusters of segments are separated by a small gap of road segments. Moreover, when the virtual distance is calculated as described above, the surviving road segments tend to form paths that follow highly-commercial streets.

In the foregoing example, the system generated the graph shown in FIG. 16 by filtering the graph in multiple stages, including filtering based on the number of POI on the edge's road segment, the number of POI on road segments neighboring the edge's road segment, the total number of connected segments, the proximity of POI to road intersections, and the density of POI, in roughly that order. However, other embodiments of system 100 may forego one or more of those stages, apply the stages in a different order, or use scores and criteria discussed in connection with one stage with another stage. By way of example, the initial score discussed in connection with FIG. 3 may be based on the segment's POI density, the virtual distance discussed in FIG. 13 may be based on a score that reflects the number of a segment's POI within a threshold distance of an intersection as discussed in connection with FIG. 12, and the system may forego the pruning discussed in connection with FIG. 12.

FIG. 10 provided one example of how a region of interest may be displayed to users. FIGS. 17-22 provide another example of displaying a region of interest.

FIG. 17 shows a map of road segments, where road segments 1750 and 1751 were determined to be of potential interest to users. The map also shows the footprints of nearby buildings, such as buildings 1701-03.

The system may generate polygons that are associated with specific road segments. For example and as shown in FIG. 18, polygon 1861 may be generated based on footprint 1851 of road segment 1751. As shown in the close-up view 1810 of the right side of footprint 1851, each edge of polygon 1861 may be a parallel to and a fixed distance away from the edge of the footprint. Polygon 1860 may be may be similarly generated based on footprint 1850 of road segment 1750.

A polygon may also be generated for each building having a characteristic associated with one or more segments. By way of example and as shown in FIG. 19, that characteristic may require the building to have an access route to the relevant segment. In that regard, the system may generate a polygon 1901 for building 1701 because it has a sidewalk 1921 from the building to road segment 1851. Although building 1702 is closer to road segment 1851 than building 1701, the system may not generate a polygon for building 1702 because its access route 1922 does not extend to segments 1850 or 1851. A polygon would be generated for building 1704 because, even though it has an access route 1934 to a road segment other than segments 1850-51, it also has an access route 1924 to segment 1850. An additional or alternative characteristic may require the building's footprint to be within a threshold distance of the relevant segments. Another characteristic may require the building to have at least one POI that matches the criteria used to select POI for identifying the segments that may be of interest to users. For instance, if segments 1850-51 were identified based on how many restaurants are located on the segment or nearby segments, no polygon would be generated for building 1705 if it does not contain a restaurant.

The edges of the polygons generated for the buildings may be parallel to and a fixed distance 1945 from the edge of building's footprint.

All of the generated polygons may be combined into a single polygon. As shown in FIG. 20, all of the polygons 1901-05 that were generated based on the footprint of buildings and all of the polygons 1860-61 that were generated based on the footprint of road segments may be combined together. In that regard, the unshaded portion 2130 of polygon 2100 shown in FIG. 21 represents the union of polygons 1901-05 and 1860-61. Holes inside polygon 2100 like hole 2150 may be filled in, narrow gaps 2140 along the outer edges such as gaps 2140-541 may be filled in, and narrow protrusions like protrusion 2160 may be removed.

The polygon may be displayed to a user on a map in order to highlight the region of potential interest to the user. By way of example, browser 2200 may display the polygon 2100 on map 2210 at a position corresponding with the relevant road and building footprints. The visual characteristics of the objects shown in the map may change based on their relevance to the polygon. By way of example, the colors of one or more of the following items may be the same or different: background 2290 of polygon 2100, building footprints 1701, 1702, 1704, 1706 and 1707 that are within the polygon and are associated with buildings containing relevant POI, a building footprint 1705 that is within the polygon and not associated with a building containing relevant POI, road footprints 2240 that are within the polygon, building footprints 1702 and 1703 that are outside of the polygon, road footprints that are outside of the polygon, and the background of the map outside of the polygon.

A name for the region may also be determined and displayed. For instance, name 2250 may be determined by selecting the name of the town or neighborhood in which the region appears, the name of the neighborhood or road with the largest number of POI, the category that was used select the POIs, a category of business common in the region, or the name of the road with the greatest footprint area with the polygon. When the region is based on a neighborhood name and there are a number of names coinciding with neighborhoods that are within, contain or are otherwise proximate to the region, the names may be ranked and a name may be selected based on how closely the associated neighborhood's geographic boundaries coincide with the boundaries of the region and the online popularity of the name.

Although many of the foregoing examples focussed on using restaurants to identify commercial corridors, other categories of POI may be used to identify other types of areas of interest. By way of example only, such as identifying areas with many museums, tourist attractions, expensive boutiques and child-friendly restaurants. Moreover, POI that are associated with a cultural identity may be used to identify areas that are also associated with that cultural identity (e.g., Little Italy of New York City).

Figure 23:
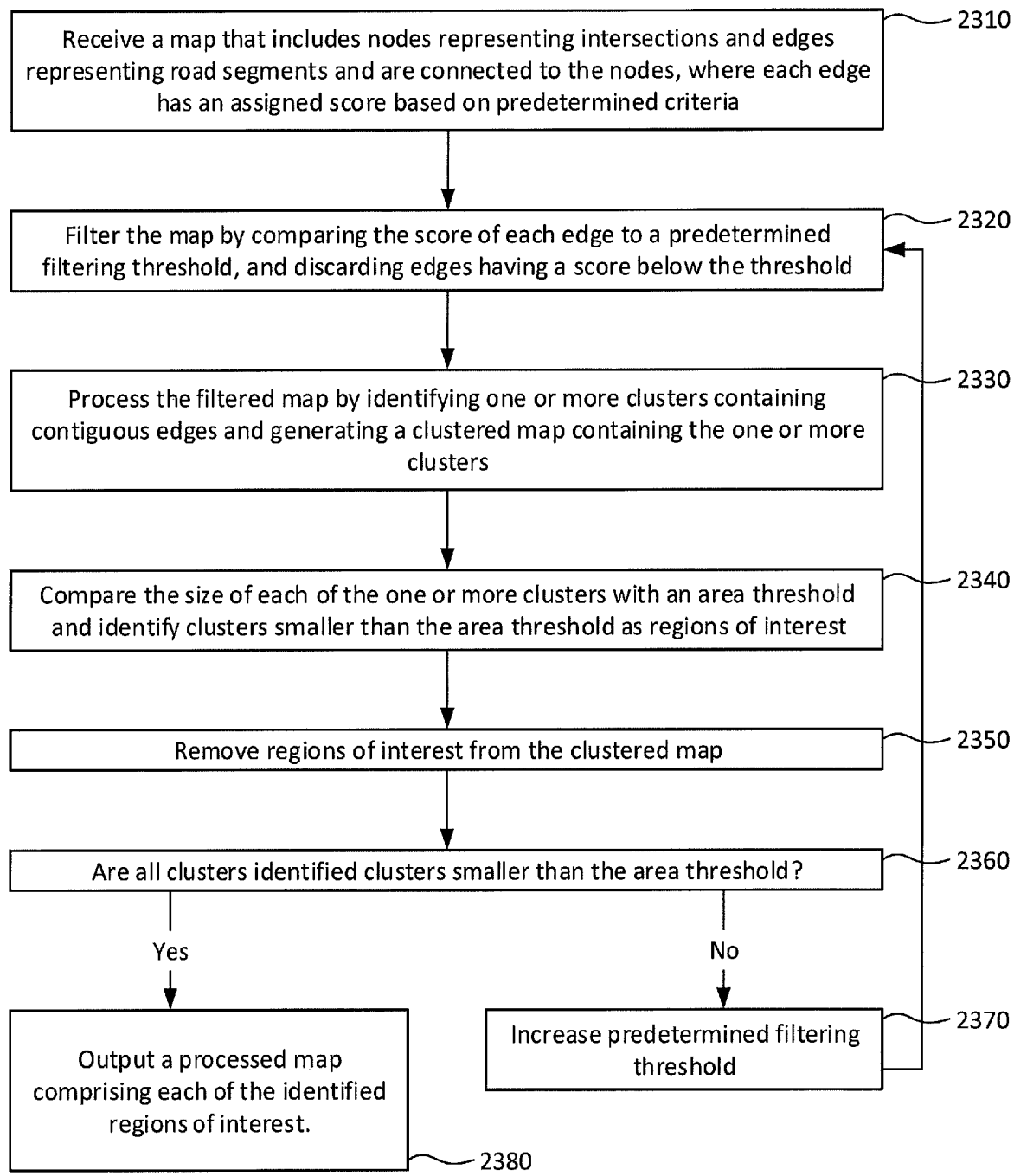
FIGS. 23-24 are flow diagrams in accordance with aspects of the disclosure.

FIG. 23 is a flowchart of a computer-implemented method of processing map information to identify regions of interest. At block 2310, a map is received that that includes a plurality of nodes connected by a plurality of edges, in which each edge has an assigned score based on predetermined criteria. At block 2320, the map is filtered by comparing the score of each edge to a predetermined filtering threshold, and discarding edges having a score below the threshold. At block 2330, the filtered map is processed by identifying one or more clusters containing contiguous edges and generating a clustered map containing the one or more clusters. At block 2340, the size of each of the one or more clusters is compared with an area threshold and identifying clusters smaller than the area threshold as regions of interest. At block 2350, regions of interested are removed from the clustered map. At block 2360, it is determined if all of the clusters identified at block 2340 are smaller than the threshold. If so, at block 2380, a processed map comprising each of the identified regions of interest is outputted. If not, then at block 2370 the predetermined filtering threshold is increased and the method returns to block 2320. The method thus continues to iteratively perform blocks 2320-2350, wherein the clustered map with the regions removed is filtered at block 2330 with an increased predetermined filtering threshold, wherein the iteration is performed until all clusters identified at block 2340 are smaller than the area threshold.

Figure 24:
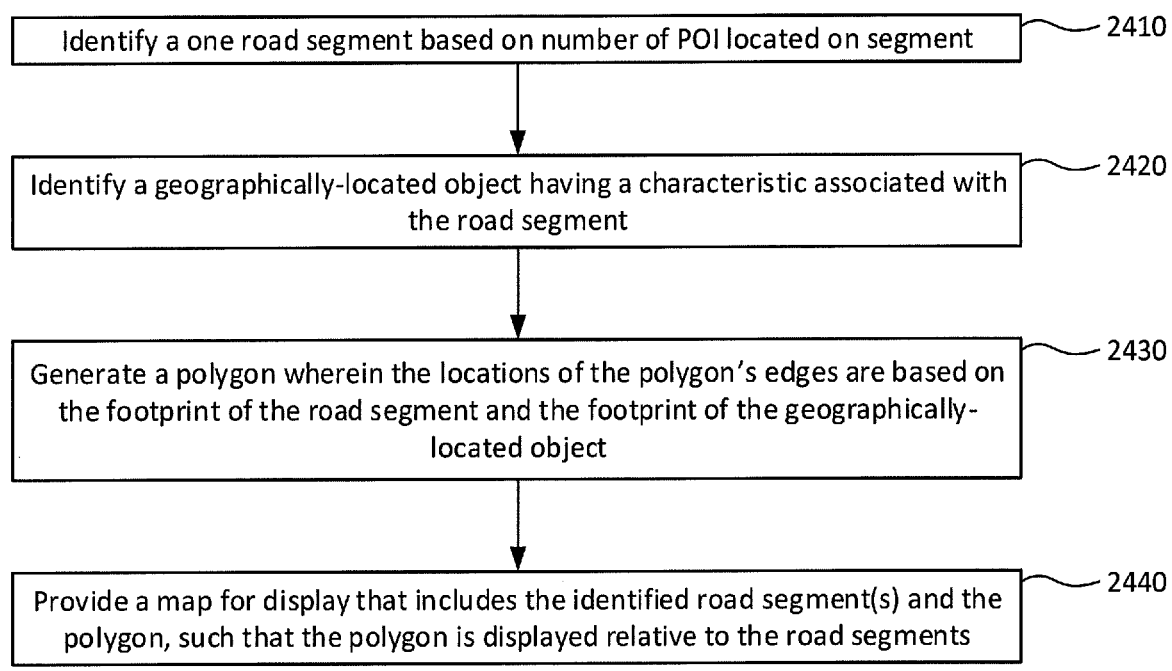

FIG. 24 is a flowchart of a computer-implemented method of displaying a map. At block 2410, a road segment is identified based on the number of POI located on the segment. At block 2420, a geographically-located object having a characteristic associated with the road segment is identified. At block 2430, a polygon is generated wherein the locations of the polygon's edges are based on the footprint of the road segment and the footprint of the geographically-located object. At block 2440, a map that displays the road segments and the polygon relative to the geographic locations of the road segments is provided.

As these and other variations and combinations of the features discussed above can be utilized without departing from the invention as defined by the claims, the foregoing description of the embodiments should be taken by way of illustration rather than by way of limitation of the invention as defined by the claims. The provision of examples of the invention (as well as clauses phrased as "such as," "e.g.", "including" and the like) should not be interpreted as limiting the invention to the specific examples; rather, the examples are intended to illustrate only some of many possible aspects. Similarly, references to "based on" and the like means "based at least in part on".

The invention claimed is:

1. A method comprising:
receiving, by one or more computing devices, a query for points of interest (POIs) within a geographic region;
identifying, by one or more computing devices, a plurality of road segments within the geographic region, wherein each road segment of the plurality of road segments has a footprint and at least one point of interest;
identifying, by the one or more computing devices, one or more buildings within the geographic region having an access route associated with at least one road segment of the plurality of road segments, each building of the one or more buildings having a footprint;
generating, by the one or more computing devices, one or more polygons having edges at locations based on the footprints of the plurality of road segments and the footprints of the one or more buildings; and
providing for display, by the one or more computing devices, a map that displays the plurality of road segments and the one or more polygons relative to the plurality of road segments.

2. The method of claim 1, wherein the query includes a category for the POIs, and each road segment of the plurality of road segments has at least one POI corresponding to the category.

3. The method of claim 2, wherein identifying the one or more buildings within the geographic region is further based on whether the one or more buildings contains at least one POI corresponding to the category.

4. The method of claim 2, wherein identifying said plurality of road segments comprises selecting road segments from a second plurality of road segments where each road segment of the second plurality of road segments is associated with a number of POIs corresponding to the category.

5. The method of claim 4, wherein each POI of the number of POIs includes a score, the score being based on a search ranking of the respective POI, and selecting road segments from the second plurality of road segments is based on a cumulative score of the number of POIs for each road segment of the second plurality of road segments.

6. The method of claim 5, wherein selecting road segments from the second plurality of road segments is based on the cumulative score of the number of POIs for each road segment of the second plurality of road segments includes selecting road segments from the second plurality of road segments is further based on the cumulative score of the number of POIs for each adjacent road segment.

7. The method of claim 5, wherein the road segments from the second plurality of road segments having a cumulative score that fails to satisfy a threshold value are not selected.

8. The method of claim 4, wherein each POI of the number of POIs includes a score, the score being based on a walking distance between the respective POI and other POIs of the number of POI, and
selecting road segments from the second plurality of road segments is based on a cumulative score of the number of POIs for each road segment of the second plurality of road segments.

9. A system comprising:
one or more computing devices; and
memory storing instructions, the instructions being executable by the one or more computing devices, wherein the instructions comprise:
receiving a query for points of interest (POIs) within a geographic region;
identifying a plurality of road segments within the geographic region, wherein each road segment of the plurality of road segments has a footprint and at least one point of interest;
identifying one or more buildings within the geographic region having an access route associated with at least one road segment of the plurality of road segments, each building of the one or more buildings having a footprint;
generating one or more polygons having edges at locations based on the footprints of the plurality of road segments and the footprints of the one or more buildings; and
providing, for display, a map that displays the plurality of road segments and the one or more polygons relative to the plurality of road segments.

10. The system of claim 9, wherein the query includes a category for the POIs, and each road segment of the plurality of road segments has at least one POI corresponding to the category.

11. The system of claim 10, wherein identifying the one or more buildings within the geographic region is further based on whether the one or more buildings contains at least one POI corresponding to the category.

12. The system of claim 10, wherein identifying said plurality of road segments comprises selecting road segments from a second plurality of road segments where each road segment of the second plurality of road segments is associated with a number of POIs corresponding to the category.

13. The method of claim 12, wherein each POI of the number of POIs includes a score, the score being based on a search ranking of the respective POI, and
selecting road segments from the second plurality of road segments is based on a cumulative score of the number of POIs for each road segment of the second plurality of road segments.

14. The method of claim 13, wherein selecting road segments from the second plurality of road segments is based on the cumulative score of the number of POIs for each road segment of the second plurality of road segments includes selecting road segments from the second plurality of road segments is further based on the cumulative score of the number of POIs for each adjacent road segment.

15. The system of claim 13, wherein the road segments from the second plurality of road segments having a cumulative score that fails to satisfy a threshold value are not selected.

16. The system of claim 12, wherein each POI of the number of POIs includes a score, the score being based on a walking distance between the respective POI and other POIs of the number of POI, and
selecting road segments from the second plurality of road segments is based on a cumulative score of the number of POIs for each road segment of the second plurality of road segments.

17. A non-transitory computing-device readable storage medium on which computing-device readable instructions of a program are stored, the instructions, when executed by one or more computing devices, causing the one or more computing devices to:
receive a query for points of interest (POIs) within a geographic region;
identify a plurality of road segments within the geographic region, wherein each road segment of the plurality of road segments has a footprint and at least one point of interest;
identify one or more buildings within the geographic region having an access route associated with at least one road segment of the plurality of road segments, each building of the one or more buildings having a footprint;
generate one or more polygons having edges at locations based on the footprints of the plurality of road segments and the footprints of the one or more buildings; and
provide, for display, a map that displays the plurality of road segments and the one or more polygons relative to the plurality of road segments.

18. The non-transitory computing-device readable storage medium of claim 17, wherein the query includes a category for the POIs, and each road segment of the plurality of road segments has at least one POI corresponding to the category.

19. The non-transitory computing-device readable storage medium of claim 18, wherein identifying the one or more buildings within the geographic region is further based on whether the one or more buildings contains at least one POI corresponding to the category.

20. The non-transitory computing-device readable storage medium of claim 18, wherein identifying said plurality of road segments comprises selecting road segments from a second plurality of road segments where each road segment of the second plurality of road segments is associated with a number of POIs corresponding to the category.

* * * * *